No. 621,493. Patented Mar. 21, 1899.
A. P. HESS.
THRESHING MACHINE.
(Application filed Dec. 23, 1897.)
(No Model.) 3 Sheets—Sheet 2.
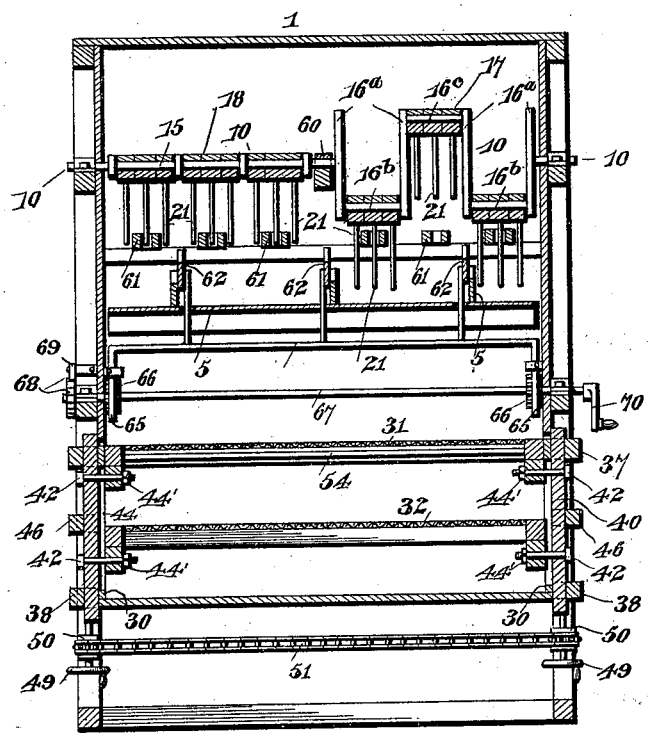
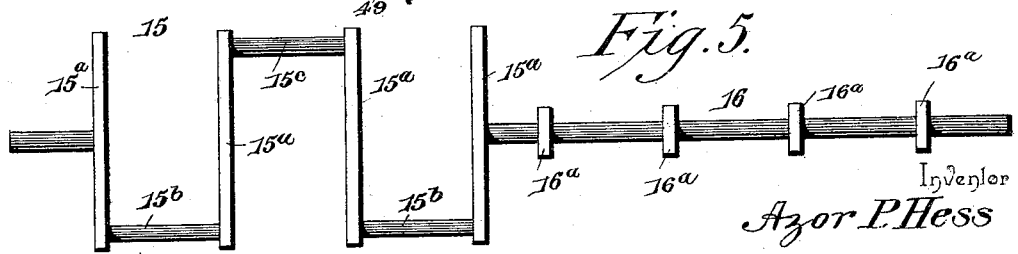
Witnesses
Inventor
Azor P. Hess
By his Attorneys,

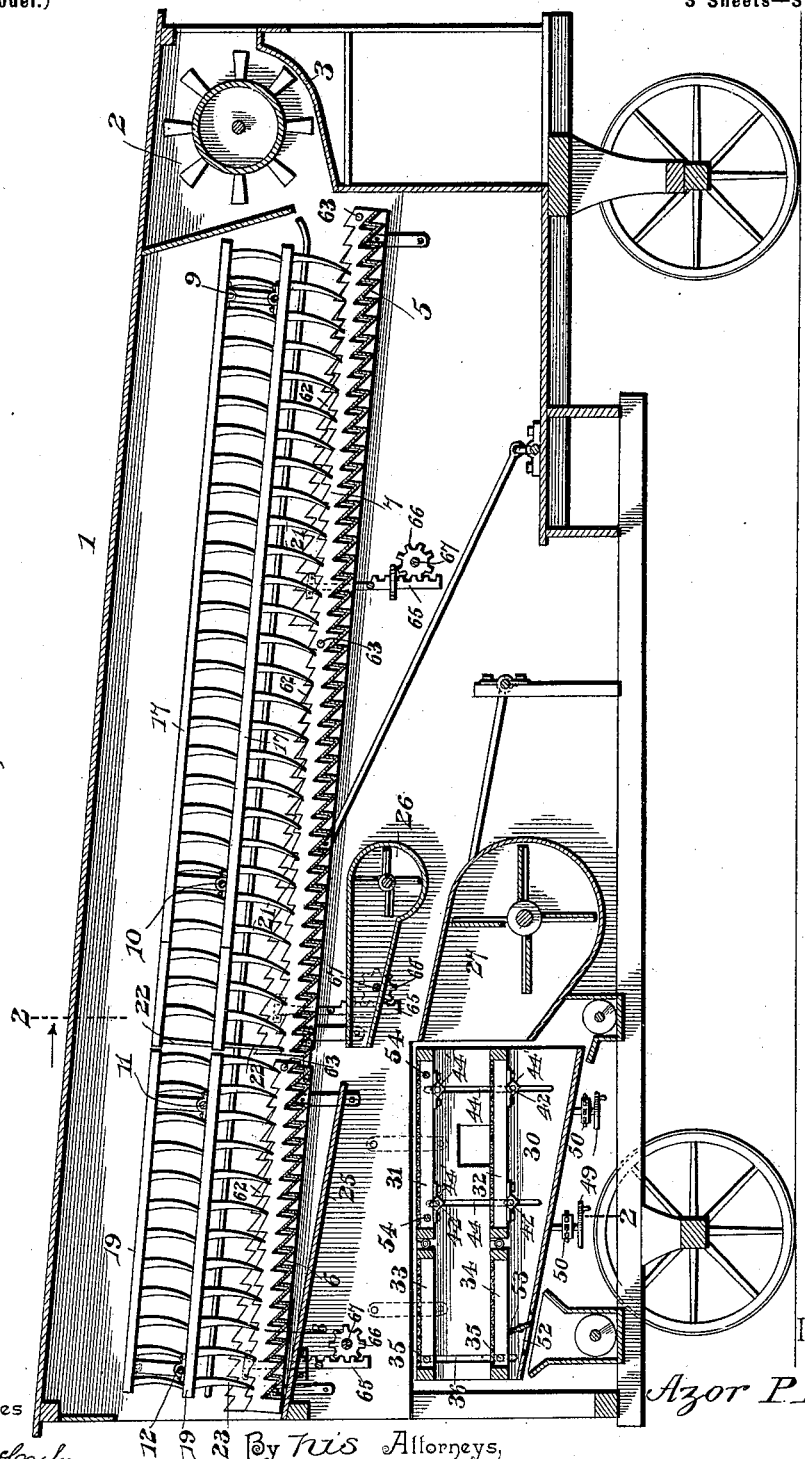

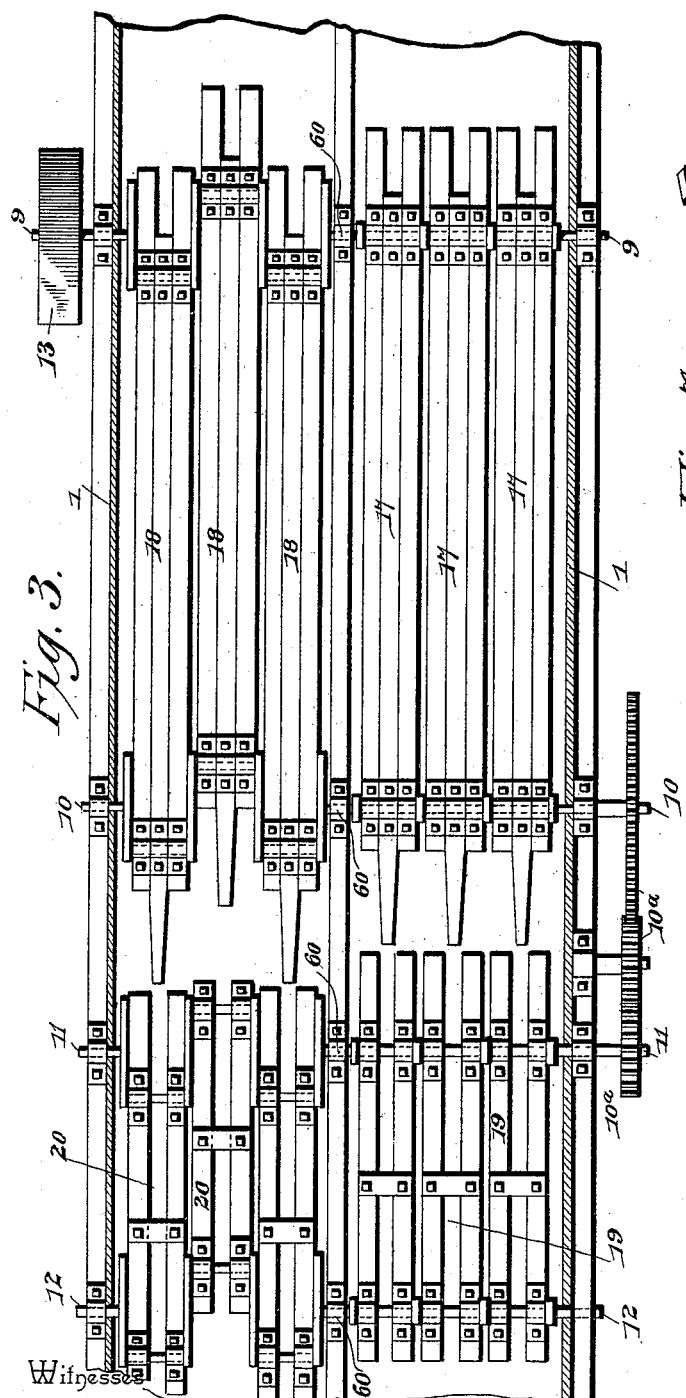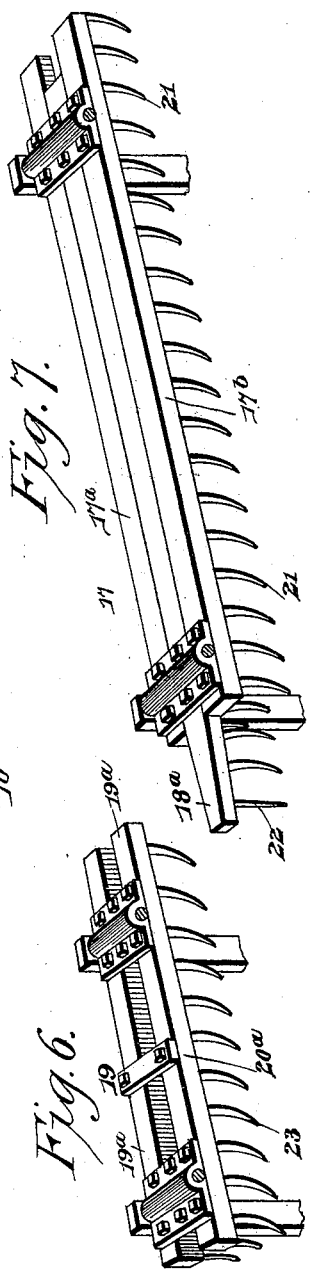

UNITED STATES PATENT OFFICE.

AZOR P. HESS, OF CHATFIELD, MINNESOTA.

THRESHING-MACHINE.

SPECIFICATION forming part of Letters Patent No. 621,493, dated March 21, 1899.

Application filed December 23, 1897. Serial No. 663,232. (No model.)

*To all whom it may concern:*

Be it known that I, AZOR P. HESS, a citizen of the United States, residing at Chatfield, in the county of Fillmore and State of Minnesota, have invented a new and useful Threshing-Machine, of which the following is a specification.

My invention relates to improvements in threshing-machines of that class which employ a series of reciprocating rakes hung over toothed bars; and one of the objects that I have in view is to provide an improved construction of the rake mechanism by which the toothed reciprocating bars are hung or carried to balance one another and to operate in a manner to spread or separate the straw and to carry the same rearwardly from the cylinder.

A further object that I have in view is to provide means for preventing the straw from being twisted or wound around the crank-shafts which actuate the overhung rake.

A further object of the invention is to provide means independent of the straw-carrier bars by which the progress of the straw through the machine may be raised within reach or access of the overhung rake to secure a more thorough action of the rake on the straw.

A further object that I have in view is to provide an improved construction of the vibrating shoe by which the pitch or position of the sieves within the shoe may be varied and changed, according to the character of the grain to be separated.

To the accomplishment of the objects above enumerated the invention consists in the combination of elements and in the construction and arrangement of parts, which will be hereinafter fully described and claimed.

To enable others to understand my invention, I have illustrated the preferred embodiment thereof in the accompanying drawings, forming a part of this specification, and in which—

Figure 1 is a vertical longitudinal sectional elevation through a threshing-machine constructed in accordance with this invention, illustrating the toothed straw-lifting bars in their raised positions. Fig. 2 is a vertical transverse sectional view on the plane indicated by the dotted line 2 2 of Fig. 1, looking in the direction indicated by the arrow. Fig. 3 is a sectional plan view showing the overhung rake, the plane of the section being taken through the machine-casing above the crank-shafts. Fig. 4 is a view in side elevation of the shaking-shoe removed from the machine-casing and showing the adjusting mechanism for the sieves therein. Fig. 5 is a view in elevation, on an enlarged scale, of one of the multiple-cranked shafts for the overhung rake. Figs. 6 and 7 are detail perspective views of the coacting members of the front and rear rake sections. Fig. 8 is a sectional elevation illustrating one of the straw-lifting bars in operative relation to one of the bars of the straw-rack.

Like numerals of reference denote corresponding and like parts in each of the several figures of the drawings.

The frame or casing of the machine may be similar in all respects to those of ordinary machines, and said casing is indicated by the numeral 1, the cylinder at 2, and the concave at 3.

Adjacent to the concave is arranged the step-shaped long grain-pan 5, and in rear of this long grain-pan is the short step-shaped grain-pan 6, which is separated from the pan 5 a suitable distance to permit the grain and chaff on the pan 5 to be discharged over the tail end of said pan 5 and immediately above the auxiliary blast-fan of the winnower. These grain-pans are represented by Fig. 1 as being sustained by links $5^a$, attached to the pans and the machine-casing, and within the casing is a cranked shaft $6^a$, adapted to be driven by suitable connections with a rotary shaft of the machine. This cranked shaft has a pitman connection $6^b$ with one or both of the grain-pans; but as the means for supporting and actuating the grain-pans are ordinary in the art I have not deemed it necessary to more particularly describe or illustrate the same.

Above the grain-pans are arranged the longitudinal stationary bars 7 8, coextensive with said grain-pans and supported within the machine-casing in the ordinary or any suitable way. These stationary bars form the rack on which the straw is supported as it travels from the cylinder to the rear of the machine. Said rack-bars are shown as having their lower edges toothed or serrated to fit in close relations to the stepped grain-pans, and the upper edges of the rack-bars are also serrated or toothed to facilitate the passage of the straw over the same under the influence of the overhung rakes.

In suitable bearings mounted on the machine-casing are arranged the crank-shafts 9 10 for the front long section of the overhung rake, and similar crank-shafts 11 12 are provided for the short rear section of the overhung rake. These crank-shafts are peculiarly formed to enable the bars forming the rakes to counterbalance each other, and the toothed bars of the front and rear sections are arranged to overlap at their contiguous ends to enable the rakes to operate to good advantage in carrying the straw rearwardly. The crank-shafts 9 10 are arranged adjacent to the ends of the front grain-pan 5, said crank-shaft 9 being provided with a driving-pulley 13, around which passes a belt to drive the rake mechanism. The other pair of crank-shafts 11 12 are arranged over the short grain-pan 6, and these crank-shafts are operatively connected to drive the rear rake-section at a higher speed than the front rake-section.

The shafts 9 10 for the front rake-section are operatively connected together by the toothed bars forming a part of said front rake-section, and these toothed rake-bars serve to transmit the rotary motion of the front crank-shaft 9 to the rear crank-shaft 10 of the long front rake-section, thus rotating the shaft 10. In like manner the crank-shafts 11 12 for the short rear rake-section are operatively connected together by the short toothed bars forming the rear rake-section, and this shaft 11 of the rear rake-section is driven from the shaft 10 of the rake-section through the intermeshing gearing $10^a$. (See Fig. 3.) This gearing $10^a$ may be of any suitable character, and its members are so arranged and proportioned as to give to the short rear rake-section a faster travel or speed than the long front rake-section.

Each of the four crank-shafts 9 10 11 12 is formed or constructed to provide a plurality of cranks, and, briefly stated, each shaft has its cranks grouped so that the group of cranks for half of the shaft are at right angles to the group of cranks for the other half of said shaft. This is clearly shown by Fig. 5 of the drawings, in which the numeral 15 designates the cranks of half the shaft at right angles to the other group of cranks 16 on the remaining half of the shaft. Each multicranked shaft is built or composed of a series of arms and a like series of crank-pins, and, as shown, the cranks 15 consist of the arms $15^a$ and the pins $15^b$ $15^c$, while the cranks 16 consist of the arms $16^a$ and the pins $16^b$ $16^c$. (See Figs. 2 and 5.) The pins of each set of cranks are arranged on opposite sides of the axial line or center of the multicranked shaft—as, for example, the pins $15^b$ $15^c$ of the cranks 15 are on one side of the shaft-axis and at one end of the crank-arms $15^a$, while the pin $15^c$ is on the opposite side of the shaft-axis and at the opposite end of the crank-arms $15^a$. This arrangement applies equally to the arms and pins of the cranks 16 at the opposite half of the crank-shaft, and the same description applies equally to each of the multicranked shafts of the four shafts used in my improved overhung rake. It will be seen that I provide a multicranked shaft in which the group of cranks for one half are at right angles to the group of cranks for the other half of the shaft, that the crank-pins of each group of cranks for each half of the shaft are disposed on opposite sides of the axial line of the shaft, and that the crank-pins for each group of cranks occupy the same plane as distinguished from the right-angled plane of the other group of cranks. This arrangement is important, because each crank-shaft is hung or balanced to insure steady uniform motion thereto; but it is not important to employ three cranks in each of two groups on a single shaft, as shown by the drawings, because it is evident that the number of groups and the number of cranks making up each group may be varied without departing from my invention.

The right-angled multicranked shafts 9 10 carry bars 17 18. The bars 17 are connected to the wrist-pins $15^b$ $15^c$ of one of the sets of cranks 15 on one half of the shafts 9 10, while the bars 18 are connected to the wrist-pins $16^b$ $16^c$ of the other set of cranks 16 of the shafts 9 10, whereby the bars 17 are adapted to be lowered or forced downwardly into the straw when the bars 18 are raised upwardly above the straw, and vice versa. The crank-shafts 9 10 and the bars 17 18 form the front long section of the rake over the long grain-pan 5. The other pair of crank-shafts 11 12 carry the toothed bars 19 20, and the bars 19 are connected to the wrist-pins $15^b$ $15^c$ of one group 15 of the right-angled multiple-cranked shafts 11 12, while the bars 20 are connected to the wrist-pins $16^b$ $16^c$ of the other group 16 of cranks of said shafts 11 12, said bars 19 20 being moved vertically in opposite directions by the double-cranked shafts 11 12. The right-angled crank-shafts 11 12 and the bars 19 20 form the rear section of the overhung rake, and said rear section is coextensive with the rear grain-pan 6 of the machine. The bars 17 18 of the front rake-section carry a series of curved teeth 21, and these teeth 21 have their lower extremities curved rearwardly in order to lift up the straw and to carry it rearward over the grain-pan 5 in the operation of the front section of the overhung rake. The teeth 22 at the rear ends of the bars 17 18 of the front rake-section are adjacent to the bars 19 20 of the rear rake-section, and said teeth 22 are preferably straight throughout their length, so as to check in a measure the rearward feed of the straw, so as to enable the teeth of the bars 19 20 of the rear rake-section to engage with the straw to good advantage. The bars 19 20 of the rear rake-section are also provided with depending rake-teeth 23, which are curved rearwardly at their lower extremities to enable the teeth to properly feed the straw toward the rear end of the machine.

I employ a peculiar construction of the rake-bars so arranged that the adjacent ends of the bars of the front rake-section may play or move between the bars of the rear rake-section during a portion of the revolution of the multicranked shafts, whereby the bars of the two rake-sections are adapted to operate to good advantage in agitating and carrying the straw over the straw-rack and prevent the straw from lodging at a point between the adjacent rake-sections.

As shown by Fig. 6, each bar 17 18 of the front rake-section consists of a plurality of three toothed sections $17^a$, $17^b$, and $18^a$, arranged parallel to and in close relation laterally to each other to occupy the space between two adjacent crank-arms of the shaft, and these members of the bar 17 or 18 are toothed, as shown, and united rigidly together in a suitable way to have the central member $18^a$ project rearwardly from the side members $17^a$ and form a tongue adapted to play in the space between the members of one of the bars 19 or 20 of the rear rake-section. Each bar 19 or 20 of the rear rake-section consists of two members $19^a$ $19^a$, provided with the teeth and coupled together at $20^a$ to lie parallel to each other and form between themselves a slot or opening, in which the tongue or rear end of the member $18^a$ of one of the front rake-section bars is adapted to move or play. By reference to Fig. 3 it will be seen that the bars 17 18 of the front rake-section are arranged in such relation to the slotted bars 19 20 of the rear rake-section as to have their tongues (or the rear extended ends of the members $18^a$) play in the slots or spaces of the divided bars 19 20 of the rear rake-section, and thus each bar of the front rake-section is adapted to coact with one of the bars of the rear rake-section to play therein, whereby the adjacent ends of the bars of the front and rear rake-sections are adapted to pass or overlap each other.

The rake-bars are connected to have diverse positions within the casing of the primary machine, owing to the peculiar formation of the cranks on the multicranked shafts. As will be seen by reference to Fig. 2, the group of cranks 16 of the four crank-shafts depress four of the rake-bars and lift the other two rake-bars, while the groups of cranks 15 of said four shafts sustain all the rake-bars in raised positions; but certain of the rake-bars always engage with the straw to feed the same through the machine, so that the movement of the straw is continuous and uninterrupted. The described arrangement of the bars forming the overhung rake and the form of the teeth on said oppositely-reciprocating bars, which move in different horizontal and vertical planes in alternate order and relation to each other, serve to produce an improved rake mechanism in which the teeth are caused not only to feed the straw toward the rear of the machine and to loosen the grain from the straw, but the straw is lifted up by the teeth in order to separate it and to free the grain from the straw to the best advantage, thus subjecting the straw to a violent agitation in its passage through the machine and insuring the thorough separation of the grain from the straw.

I prefer to journal the multicranked shafts at their ends in suitable bearings on the primary machine-casing and to provide a central bearing 60, which is fixed in the machine in the direction of the length thereof and at the middle of the same to provide a central support for the cranked shafts. (See Fig. 2.) In connection with the stationary straw-rack and the overhung rake I employ a series of detaining-bars 61, arranged at suitable intervals from each other between the straw-rack bars and the shafts of the overhung rake to prevent the straw from passing up to the cranked shafts and winding around the latter to interfere with the free operation thereof. These detaining-bars extend longitudinally of the machine and are fixed therein in any suitable way. Said bars are arranged parallel to each other, are spaced apart, as shown by Fig. 2, to permit the teeth of the overhung rake-bars to pass through or play between them, and they constitute a slotted floor or bottom between the rack-bars and the rake to limit the upward movement of the straw under the action of the rake-bars and the adjustable lifting-bars 62, which I will now proceed to describe. These lifting-bars 62 are arranged in series at intervals of the length of the machine, and they are independent of the straw-rack bars, to which they are pivoted at 63, so that they may be lifted a limited distance toward the slotted bottom formed by the bars 61. The lifting-bars 62 are arranged in groups between the rack-bars, and they have their front ends pivoted to said rack-bars to enable them to be lowered flush with the rack-bars when desired. Said lifting-bars have their front working edges toothed or serrated, as at $64^a$, to engage with the straw, and each series of these lifting-bars across the machine are joined or coupled together by a coupling-bar 64, with which is combined means for raising or lowering said bars 62 more or less in the path of the straw. The adjusting means which I prefer to employ consist of the rack-bars 65, attached to the coupling-bar or to the lifting-bars in a suitable way, and the gear-pinions 66, carried on a transverse adjusting-shaft 67, suitably journaled in the machine-casing. This adjusting-shaft is designed to be locked in position to hold the lifting-bars in their raised or adjusted positions by means of ratchet-wheels 68, engaging with suitable detents or pawls 69, and this adjusting-shaft is provided with a suitable crank 70 for conveniently rotating it to adjust the series of lifting-bars simultaneously. It will be understood that each series of lifting-bars is equipped with the described means for adjusting the same and that said bars may be raised or lowered independently.

Beneath the rear section of the overhung rake, the short grain-pan 6, and the serrated bars 8 is arranged the return-board 25, which inclines toward the auxiliary fan or blower 26. This auxiliary blower 26 is independent of the shaking-shoe 30, and it is situated in advance of the front edge of the inclined return-board and of the interval between the grain-pans 5 6, so that the grain and chaff as they fall from the pan 5 to the shaking-shoe are subjected to an initial blast of air from the auxiliary fan before they reach the shoe and are exposed to the action of the sieves therein and the primary blower 27 of said shaking-shoe. As is usual in threshing-machines, the primary blower 26 is situated in advance of the shaking-shoe, the blowers 26 27 being driven by suitable power connections with one of the shafts of the threshing-machine. I have not deemed it necessary to illustrate the driving means for the blowers, because the ordinary belt connections may be used to actuate said blowers.

The shaking-shoe is arranged within the machine-casing in the ordinary way, and within the frame of the shoe are arranged the adjustable screen-frames 31 32, one of which screen-frames lies above the other. In line with the screen-frames 31 32 are arranged the tailings-screens 33 34, and the upper tailings-screen 33 is hinged to the upper screen-frame 31, while the other tailings-screen 34 is hinged to the lower screen-frame 32, as shown by Fig. 1. The screen-frames are thus arranged to sustain the front ends of the tailings-screens; but the rear ends of these tailings-screens are adjustably supported in position to enable the tailings-screens 33 34 to assume different angular positions with relation to screens or riddles carried by the frames 31 32 of the shoe 30. I preferably support each tailings-screen in position adjustably by the bolts 35, which are attached to the frame of the tailings-screen and which pass through vertical slots 36, formed in the sides of the shoe-frame.

On the outside of the shoe-frame, at points near the front and rear edges of the screen-frames 31 32, are fastened the guides or keepers 37 38, a pair of which is provided at each side of the shoe-frame. In these guides or keepers are loosely fitted the vertically-movable carrier-bars 40 41. The carrier-bars are each connected to the screen-frames 31 32 by means of the bolts 42 42, which pass through openings in the screen-frames, through slots 44 in the shoe-frame, and through openings in the carrier-bars 40 41, the inner ends of the bolts being fitted in nuts 44' on the screen-frames. The carrier-bars 40 at opposite sides of the shoe-frame are connected by the bolts to the two screen-frames 31 32 at the rear ends thereof, while the other pair of carrier-bars 41 41 are connected by the bolts 42 with the two screen-frames at or near the front ends thereof. Each carrier-bar is provided with a lateral offset or extension 46, in which is provided a nut or threaded bearing 47 to receive an adjusting screw-shaft 48, and each screw-shaft is fitted loosely in the pair of guides or keepers which serve to direct the carrier-bar with which the adjustable screw-shaft is devoted. I provide each screw-shaft with collars $48^a$ to prevent the shaft from having endwise movement in the guides or keepers, and the lower ends of the series of four adjusting screw-shafts are extended below the frame of the shoe to enable the shafts to receive the hand-wheels 49 and the sprocket-wheels 50. The sprockets of each pair of adjusting screw-shafts are operatively connected by a sprocket-chain 51, each of which passes around the sprocket-wheels of one pair of screw-shafts to enable the latter to be adjusted simultaneously, and thus the screen-frames may be raised or lowered at opposite ends independently within the frame of the shaking-shoe to vary the inclination of the screens or sieves according to the nature of the grain to be cleaned.

The floor of the shaking-shoe is provided with a slot 52 beneath the tailings screens or sieves, through which the grain may pass to the elevator through the medium of a screw conveyer or a conveyer of another form operating in a suitable trough or receptacle which communicates with the shoe through the slot 52 in the floor thereof. Above this slotted floor is arranged a wind-board or deflector 53, which is hung in the shoe-frame in a suitable manner and which may be adjusted in a proper manner to vary the angle or inclination of the wind-board or deflector to the blast from the fan 27 as may be desired.

It will be observed that in my improved vibrating shoe the screen-frames are attached to the carrier-bars by short bolts which pass through slots in the shoe-frame, thus obviating the employment of long bolts which pass across the space between the sides of the shoe-frame; but to prevent the screen-frames from collapsing and to keep the parts in their proper positions I provide the stay-rods 54, which are fastened to the end bars of each screen-frame.

This being the construction of my improved threshing-machine, the operation may be described, briefly, as follows: The grain is threshed by the cylinder and fed to the rake mechanism. The reciprocation of the toothed bars of the rake through the straw separates the grain from the straw, so that the grain falls through the bars 7 8 and upon the grain-pans, while the straw is carried rearwardly by the rakes and discharged from the open rear end of the machine. The grain-pans being vibrated, the grain and chaff thereon fall through in advance of the auxiliary fan 26, by which the chaff and grain are subjected initially to the action of a blast of air to separate in a measure the chaff from the grain, and thence the grain and chaff are deposited upon the shaking-shoe to effect the final cleansing of the grain, the cleaned grain being carried by a suitable conveyer to the elevator.

I am aware that changes in the form and proportion of parts and in the details of construction of the mechanisms herein shown and described as the preferred embodiment of the invention may be made by a skilled mechanic without departing from the spirit or sacrificing the advantages of the invention. I therefore reserve the right to make such modifications and alterations as fairly fall within the scope of the invention.

Having thus fully described my invention, what I claim as new, and desire to secure by Letters Patent, is—

1. In a threshing-machine, the combination with a straw-rack, of the crank-shafts, 9, 10, having multiple cranks arranged at right angles to each other, a set of toothed bars, 17, 18, connected with the right-angled cranks of said shafts and arranged to be reciprocated thereby, another pair of crank-shafts, 11, 12, and another set of toothed bars connected with the crank-shafts, 11, 12, for the purposes described, substantially as set forth.

2. In a threshing-machine, the combination with a straw-rack, of the crank-shafts, 9, 10, having their cranks arranged at right angles to each other, another set of crank-shafts with their cranks at right angles to each other, a set of bars, 17, 18, connected to the cranks of the shafts, 9, 10, and provided with the curved teeth and with straight teeth at the rear ends, another set of bars, 19, 20, having depending teeth and arranged to overlap the bars, 17, 18, and means for driving the crank-shafts, substantially as described.

3. In a threshing-machine, a shaking-shoe comprising a frame, screens supported one above the other within said frame for vertical adjustment therein, devices attached to said screens and connected for joint operation to impart simultaneous adjustment to all the screens in a vertical direction within the frame, and tailings-screens having hinged connections with the rear ends of said first-named screens and each tailings-screen having pivotal connection at its rear end with the shoe-frame, substantially as described.

4. In a threshing-machine, a shaking-shoe comprising a casing or frame, two pairs of carrier-bars slidably fitted to said casing, screens attached near their respective ends to said carrier-bars for adjustment vertically therewith, pairs of screw-shafts supported on the casing and connected with the carrier-bars, and independent sprocket-chains connecting the screw-shafts in pairs and each arranged to adjust the carrier-bars and one end of said screens independently of other pairs of carrier-bars and opposite ends of the screens, whereby the screens may be adjusted vertically or given any desired inclination within the shoe-casing, substantially as described.

5. In a threshing-machine, a shaking-shoe comprising a casing, carrier-bars slidably fitted thereto, screw-shafts connected to the carrier-bars and coupled in pairs by sprocket-chains for adjusting the pairs of carrier-bars independently of each other, screens pivotally connected with the separately-adjustable pairs of carrier-bars, tailings-screens pivoted at their front ends to the first-named screens and adjustable therewith, and means for adjustably supporting the rear ends of the tailings-screens within the shoe, substantially as described.

6. In a threshing-machine, a shaking-shoe comprising a vertically-slotted casing provided with keepers, the carrier-bars slidably fitted to said keepers, screw-shafts mounted on the casing and connected with the carrier-bars, sprocket-chains connecting the screw-shafts in pairs and adapted to operate the pairs of carrier-bars independently of each other, screens having pivotal bolts which pass through the slotted casing and are connected to said carrier-bars, tailings-screens pivoted at their front ends to the first-named screens and supported thereby, and adjustable clamping-bolts attached to the tailings-screens and fitted to the slotted casing to support the rear ends of the tailings-screens, substantially as described.

7. In a threshing-machine, the combination of crank-shafts carrying a series of toothed bars and forming a front rake-section, a rear rake-section arranged in rear of the first-named rake-section and formed by toothed bars and crank-shafts, the rear rake-section having its cranked shafts arranged in the same horizontal plane as the cranked shafts of the front rake-section, mechanism operatively connected with the two rake-sections to drive the same at variable speeds, and straw-carrier bars situated below the rake-sections, whereby the rear rake-section travels at higher speed than the front rake-section to rapidly carry off the straw, substantially as described.

8. In a threshing-machine, the combination with a straw-rack, of a front rake-section having its toothed bars carried by multicranked shafts, 9, 10, a rear rake-section with its toothed bars carried by other multicranked shafts, 11, 12, arranged in the same horizontal plane as the first-named shafts and with the shaft, 11, geared to the shaft, 10, for imparting higher speed to the rear rake-section than the travel of the front rake-section, the toothed bars of the rake-sections arranged to pass each other at their contiguous ends during the vertical and endwise reciprocating play of said bars relatively to the straw-rack, substantially as described.

9. In a threshing-machine, the combination with a straw-rack, of an overhung reciprocating rake mechanism divided transversely into front and rear sections, the bars of one rake-section adapted to overlap the bars of the other rake-section, and means for imparting simultaneous movement to the two rake-sections, substantially as described.

10. In a threshing-machine, the combination with a straw-rack, of a series of cranked shafts, a series of bars actuated by certain of the shafts to constitute a rear rake-section and said bars provided with slots at their front ends, another series of bars actuated by certain other shafts to constitute a front rake-section and having tongues at the rear ends to play in the slots of the rear section-bars, and means for rotating said shafts to drive the two series of bars independently, whereby the slotted and tongued ends of the bars are arranged to play past each other without leaving an opening or space of any considerable area between the contiguous ends of the bars, substantially as described.

11. In a threshing-machine, the combination with a straw-rack, and an overhung rake mechanism, of a series of normally stationary lifting-bars independent of the straw-rack and adjustably supported between the rack and the rake to lie in the path of the straw and to lift the latter toward the rake, substantially as described.

12. In a threshing-machine, the combination with a straw-rack, and an overhung rake mechanism, of a series of normally stationary toothed lifting-bars pivoted to lie adjacent to the rack, and means for elevating said lifting-bars toward the rake to interpose the same in the path of the straw, substantially as described.

13. In a threshing-machine, the combination with a straw-rack, and an overhung rake mechanism, of a series of normally stationary toothed lifting-bars pivoted to lie adjacent to said rack, adjusting rack-bars operatively connected with said lifting-bars, and means for locking the adjusting-shaft, substantially as described.

In testimony that I claim the foregoing as my own I have hereto affixed my signature in the presence of two witnesses.

AZOR P. HESS.

Witnesses:
ROBT. L. GLASBY,
Mrs. R. L. GLASBY.